(12) United States Patent  
Mellor et al.

(10) Patent No.: US 6,474,379 B1
(45) Date of Patent: Nov. 5, 2002

(54) AUTOMATIC FLITCH PLANER

(75) Inventors: David Mellor, Lockport, NY (US); Juergen F. Trost, Canfield, OH (US); Mark J. Lorenc, North Tonawanda, NY (US); Daniel J. Rastatter, Beaver Falls, PA (US)

(73) Assignees: Merritt Plywood Machinery, Inc., Lockport, NY (US); Danzer Services, Inc., Darlington, PA (US)

( * ) Notice: Subject to any disclaimer, the term of this patent is extended or adjusted under 35 U.S.C. 154(b) by 66 days.

(21) Appl. No.: 09/686,582

(22) Filed: Oct. 11, 2000

Related U.S. Application Data
(60) Provisional application No. 60/171,063, filed on Dec. 16, 1999.

(51) Int. Cl.[7] .............................. B27B 1/00; B27C 1/00; B27C 5/02
(52) U.S. Cl. ..................... 144/357; 144/114.1; 144/116; 144/134.1; 144/242.1; 144/245.1; 144/402; 700/167
(58) Field of Search .......................... 700/90, 159, 167; 144/2.1, 134.1, 114.1, 116, 242.1, 245.1, 356, 357, 402

(56) References Cited

U.S. PATENT DOCUMENTS

| | | |
|---|---|---|
| 3,295,571 A | 1/1967 | Bork |
| 3,538,966 A | 11/1970 | Collins |
| 3,614,968 A | 10/1971 | Hirz |
| 3,796,243 A | 3/1974 | Komaki |
| 4,083,391 A | 4/1978 | Cremona |
| 4,601,317 A | 7/1986 | Brand |
| 5,031,677 A | 7/1991 | Cremona |
| 5,345,983 A * | 9/1994 | de Abreu ................ 144/116 |
| 5,385,184 A | 1/1995 | Mellor |
| 5,447,186 A * | 9/1995 | Achard et al. ............. 144/116 |
| 5,511,598 A | 4/1996 | Brand |
| 5,701,938 A * | 12/1997 | Brand ................ 144/356 X |
| 5,819,828 A * | 10/1998 | Brand ................ 144/356 X |
| 5,865,232 A | 2/1999 | Miller et al. |
| 5,960,104 A * | 9/1999 | Conners et al. ......... 144/402 X |
| 5,979,524 A | 11/1999 | Trost |

* cited by examiner

*Primary Examiner*—W. Donald Bray
(74) *Attorney, Agent, or Firm*—Simpson & Simpson, PLLC

(57) ABSTRACT

A method and apparatus for automatically planing a flitch. The method of the invention comprises measuring the distance between the top and bottom surfaces of the flitch at a plurality of longitudinally spaced locations, calculating a planing operation of the flitch based upon the plurality of distance measurements; and then planing the flitch according to the calculation. In a preferred embodiment, the measurements are taken by a bank of photodetectors in combination with a computer (microprocessor). The calculation is done by the microprocessor. The apparatus of the invention comprises means for making a plurality of distance measurements between a first generally planar surface of the flitch and a second generally frustoconical surface of the flitch, means for calculating a planing operation for the flitch based upon the measurements, and, means for planing the flitch in accordance with the calculations a variety of different types of planing heads can be used to do the actual planing, and the invention is not limited to any particular type or number of planing heads. The invention is capable of cutting stepped grooves in the bottom surface of the flitch to enable more stable veneer slicing on rotary cutters.

14 Claims, 18 Drawing Sheets

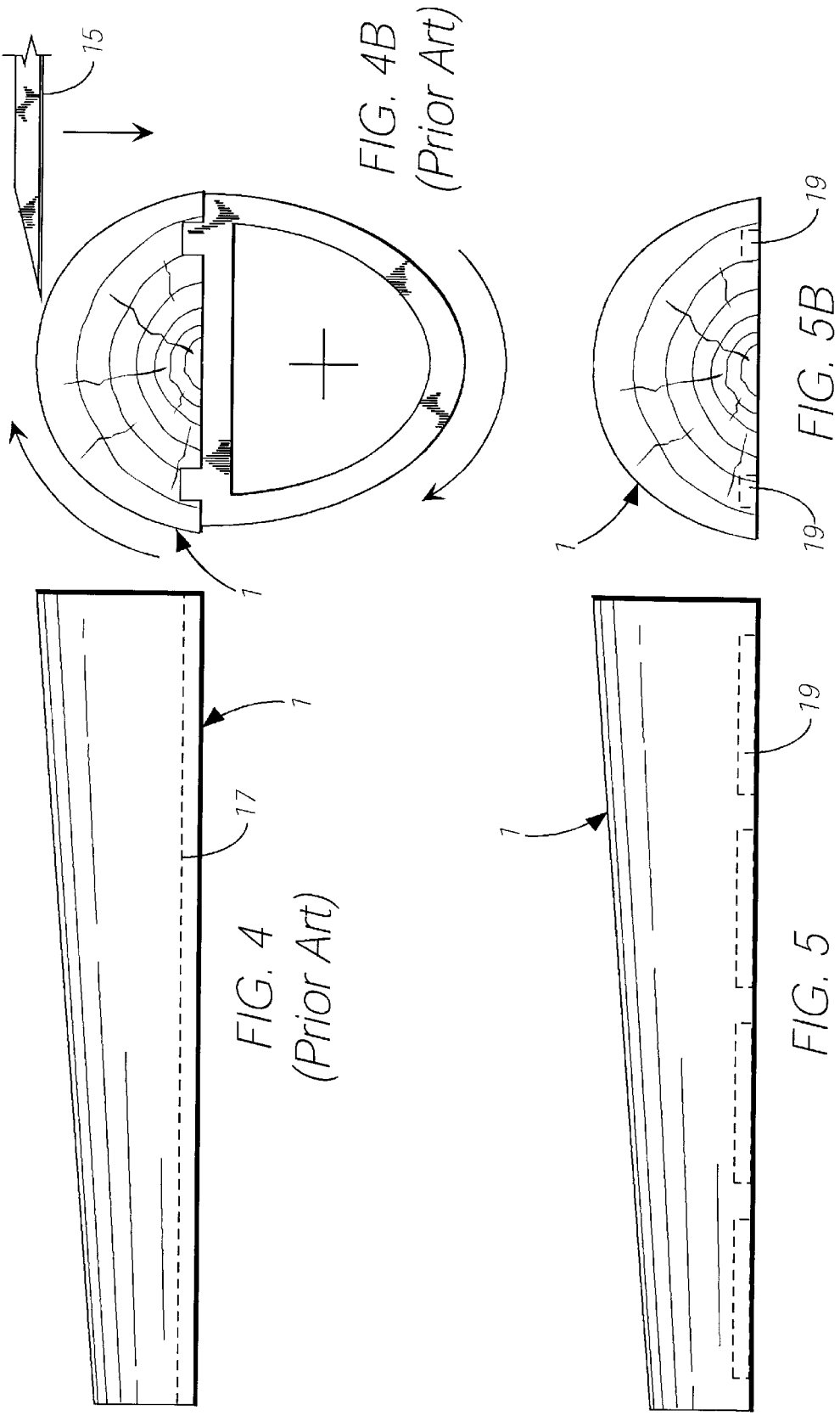

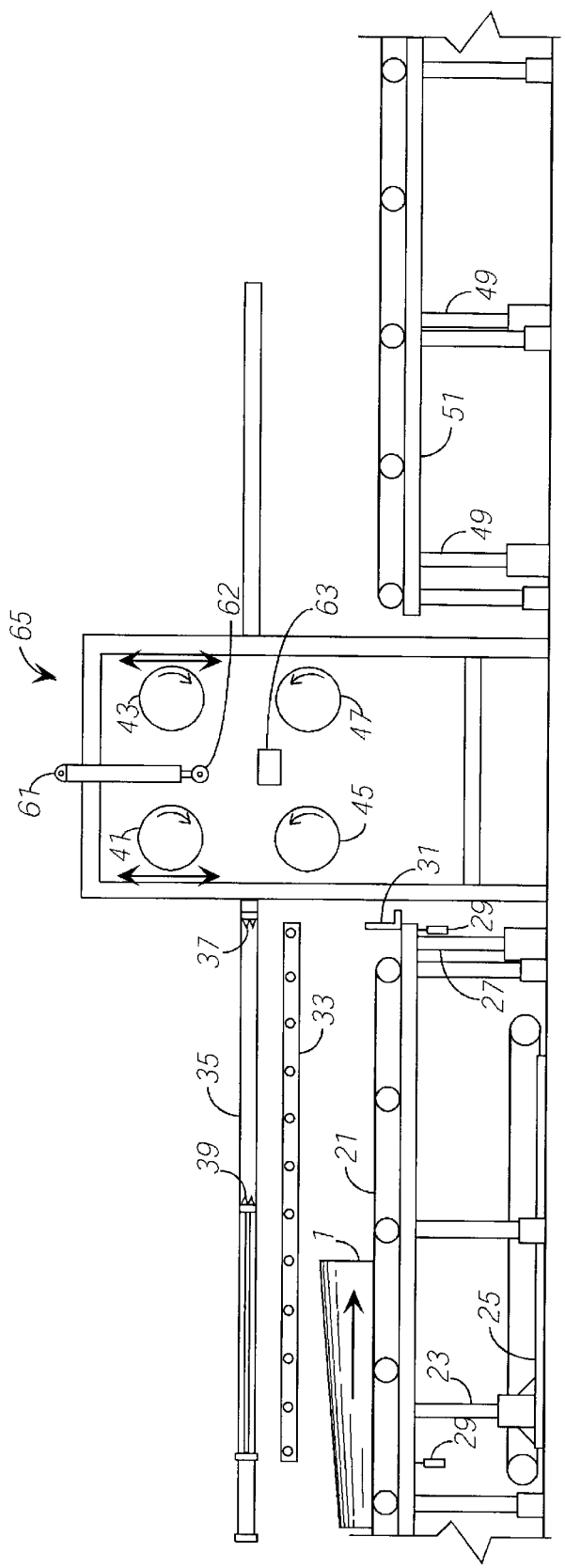
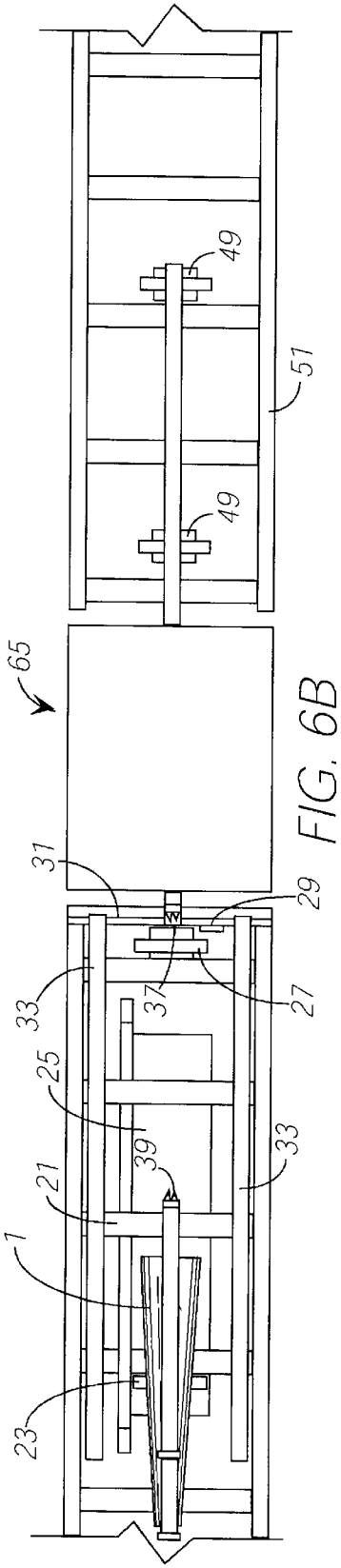
FIG. 6
FIG. 6B

AUTOMATIC FLITCH PLANER

RELATED APPLICATION

This application claims the benefit of U.S. Provisional Application Ser. No. 60/171,063, filed Dec. 16, 1999.

FIELD OF THE INVENTION

This invention relates generally to an apparatus for preparing flitches for the manufacture of wood veneer; and, more particularly, to a method and apparatus for automatically planing flitches.

BACKGROUND OF THE INVENTION

Wood veneer is made by slicing pre-conditioned logs (or half-logs), commonly called "flitches". A flitch is "half a log" and is made by cutting the log in half longitudinally. Prior to slicing, the flitch is soaked in water. As a result of the cutting and soaking, warpage occurs, making it necessary to plane the flitch prior to slicing. The flitch is planed in order that smooth surfaces are presented to the slicing apparatus. In the slicer, the flitch is held by a holding device, such as the vacuum holding device described in U.S. Pat. No. 5,385,184. A flat flitch surface facing the holding device ensures a better hold. A flat flitch surface opposite the holding device ensures better quality veneer.

In planing a flitch, it is desired to maximize the yield and minimize the amount of waste. Presently, planing is done manually, with no measurements made either before or during the planing operation. Moreover, presently, planing is done using a straight blade that is manually adjustable in ⅛ or ¼ inch intervals. Measurements during planing are presently typically done "by eye", i.e., an operator determines when the flitch has been properly planed. If any measurements of the flitch are taken at all, they are taken manually. Usually, no measurements are taken either before or after the planing operation. As a result, present planing techniques and machines result in wasted material.

What is needed, then, is a machine and method for planing flitches that maximizes yield and minimizes waste.

SUMMARY OF THE INVENTION

The invention broadly comprises a method and apparatus for automatically planing a flitch. The method of the invention comprises measuring the distance between the top and bottom surfaces of the flitch, and the linearity of those surfaces, at a plurality of longitudinally spaced locations, calculating a planing operation of the flitch based upon the plurality of distance measurements; and then planing the flitch according to the calculation. In a preferred embodiment, the measurements are taken by a bank of photodetectors in combination with a computer (microprocessor). The calculation is done by the microprocessor. The apparatus of the invention comprises means for making a plurality of distance measurements between a first generally planar surface of the flitch and a second generally frustoconical surface of the flitch, means for calculating a planing operation for the flitch based upon the measurements, and, means for planing the flitch in accordance with the calculations. A variety of different types of planing heads can be used to do the actual planing, and the invention is not limited to any particular type or number of planing heads. The invention is capable of cutting stepped groves in the bottom surface of the flitch to enable more stable veneer slicing on rotary cutters.

A primary object of the invention is to provide a method and apparatus for automatically planing a flitch so as to maximize yield and minimize waste.

A secondary object of the invention is to automate the flitch planing operation to expedite the operation and minimize human error and intervention.

A further object of the invention is to provide stepwise planing of flitches to prevent breakage of veneer tips presently caused by continuous planing methods.

Another object of the present invention is to provide a method and machine for creating stepped grooves within a bottom surface of a flitch to accommodate more stable holding of the flitch when performing rotary veneer cutting operations.

These and other objects, features and advantages of the present invention will become readily apparent to those having ordinary skill in the art in view of the following detailed description in view of the several drawing figures and appended claims.

BRIEF DESCRIPTION OF THE DRAWINGS

FIG. 4 is an elevational view of a prior art flitch having two longitudinal grooves planed therein;

FIG. 4B is an end view of the flitch shown in FIG. 4;

FIG. 5 is an elevation view of a flitch having a plurality of discontinuous grooves planed therein;

FIG. 5B is an end view of the flitch shown in FIG. 5;

FIG. 6 is an elevational view of the apparatus of the invention as a flitch is being fed into the apparatus via the infeed conveyor;

FIG. 6B is a plan view of the apparatus shown in FIG. 6;

FIG. 16B is a view similar to that of FIG. 16 but showing the lift in its raised position;

FIG. 16C is a side elevational view of the lift of FIG. 16B; and,

DETAILED DESCRIPTION OF THE PREFERRED EMBODIMENT

Figure 1B:
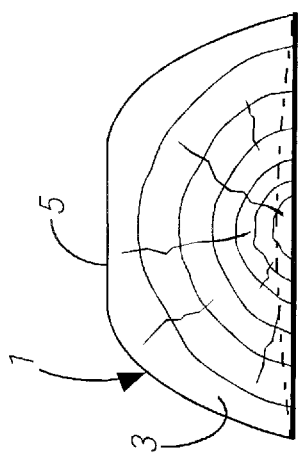
FIG. 1B is an end view of a flitch after soaking and before planing.

At the outset, it should be clearly understood that like reference numerals are intended to identify the same structural elements, portions or surfaces consistently through out the several drawing figures, as such elements, portions or surfaces may be further described or explained by the entire written specification, of which this detailed description is an integral part. Unless otherwise indicated, the drawings are intended to be read together with the specification, and are to be considered a portion of the entire "written description" of this invention.

Figure 1:
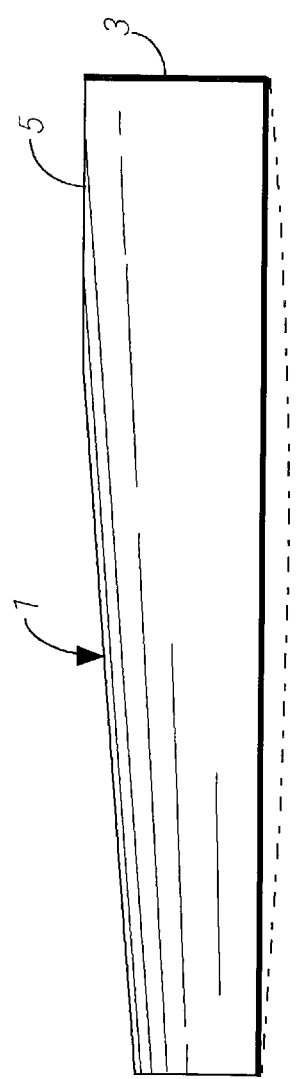
FIG. 1 is a side elevation view of a flitch arranged longitudinally after soaking and before planing.

FIG. 1 is a side elevational view of a flitch 1 arranged longitudinally, shown after soaking. A flitch is a "half a log", made by cutting a log longitudinally down its center. Hence, the cross-section of a flitch is substantially half a circle (although not a perfect circle). The bark is removed prior to planing. Ideally, the bottom surface of the flitch is flat; unfortunately, after cutting and soaking the flitch is typically warped as shown by the dotted line in FIG. 1. Planing is done to create one or more flat top surfaces 5 as shown in FIG. 1, as a prelude to cutting thin veneer slices from the flitch. Flat surface 3 is the surface that results when the tree is initially cut—surface 3 is closest to the ground. Hence the diameter of the tree is largest closest to surface 3. An end view of the flitch is shown in FIG. 1B. As shown in this view, occasionally the flitch may also be warped concavely as indicated by the dotted line in FIG. 1B.

Figure 2:
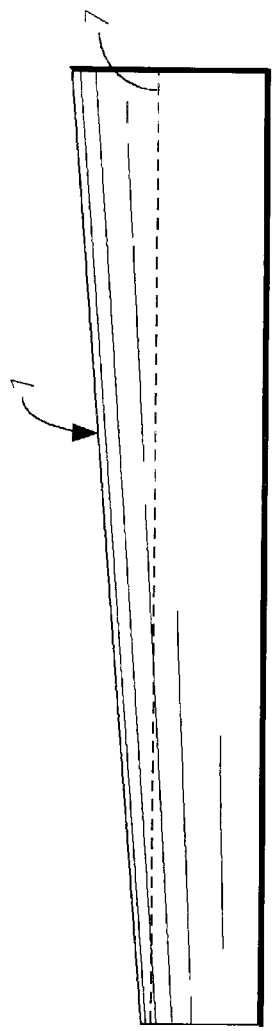
FIG. 2 is a view similar to that of FIG. 1 but showing a typical planing cut 7 made on the top surface of the flitch.
Figure 2B:
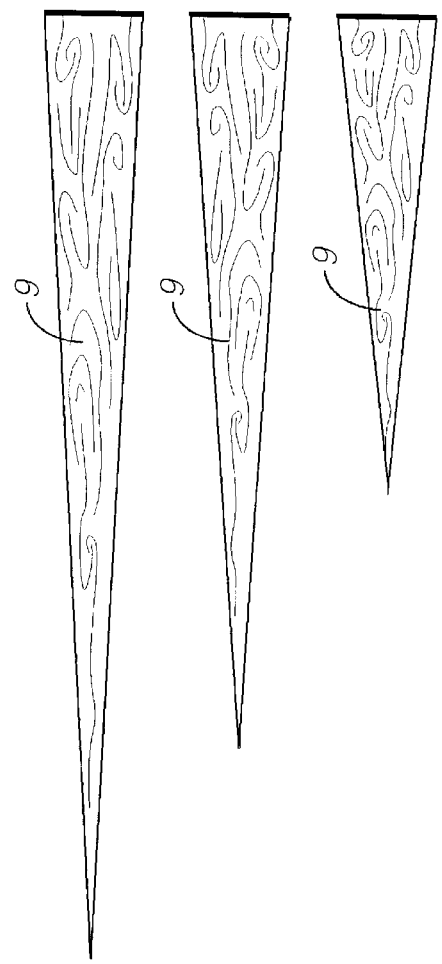
FIG. 2B is a plan view showing the resulting veneer pieces made from the flitch as planed in FIG. 2.

Presently, flitches are usually planed by machines in a manual manner in a continuous planing pass or operation. That is, the flitch is passed through a straight or concave cutting head, and the head is not adjusted or moved once the planing begins. The resulting cut 7 is shown by dotted line 7 in FIG. 2. The resulting veneer pieces 9 resulting from the planing of flitch 1 are shown in FIG. 2B. A problem with these pieces is that they all terminate in a point (or substantially in a point) as shown to the left of each piece. These points, or tips, frequently break off during subsequent handling, resulting in waste. Moreover, the pointed end is of little value.

Figure 2C:
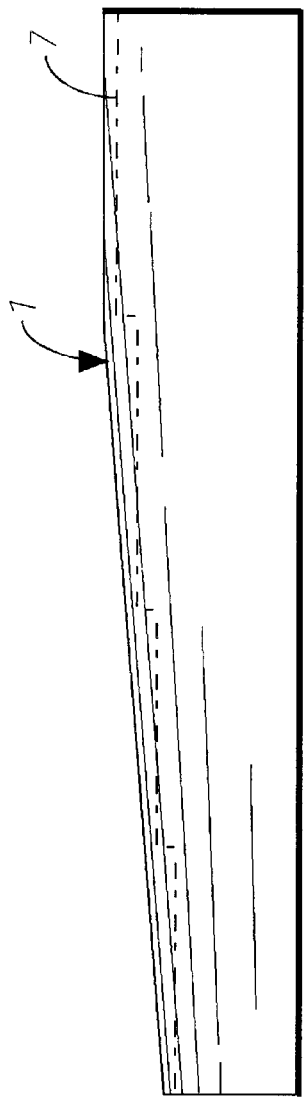
FIG. 2C is a view similar to that of FIG. 2 but showing a stepped planing cut 7 made on the top surface of the flitch.
Figure 2D:
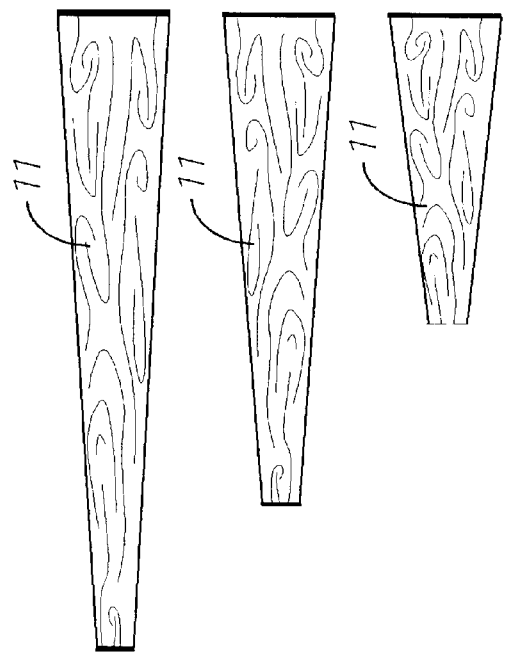
FIG. 2D is a plan view of the veneer pieces that would result from the stepped planing of the flitch shown in FIG. 2C.

The automated planing operation of the present invention is capable of making stepped surfaces 7 as shown in FIG. 2C. These surfaces are made by lowering the top planing head deeper into the fitch as the flitch progresses through the planer. These stepped planing operations result in veneer pieces 11 shown in FIG. 2D. Note that these pieces do not have the points produced by the prior art planing methods.

FIG. 6 is an elevational view of apparatus 10 of the invention as flitch 1 is being fed into the apparatus via the infeed conveyor 21. The flitch proceeds rightwardly along the conveyor in the direction indicated by the arrow on the flitch. Photodetector 29 senses the presence of the flitch on conveyor 21. The speed of infeed conveyor 21 is known. Therefore, as the flitch passes detector 29, beginning and end signals can be generated and, from the time between these signals, the length of the flitch can be calculated. When the leftward end of the flitch passes rightwardly of photodetector 29, movable lift 23 begins to move rightwardly along base plate 25. Now that a computer apparatus of the invention of (microprocessor) has calculated the length of the flitch, the movable lift can be accurately aligned beneath the leftward end of the flitch when it comes to a stop. FIG. 6B is a plan view of the apparatus shown in FIG. 6.

Movable lift 23 is driven along base plate 25 by timing belt 61 which, in turn, is driven by conveyor rollers 62 and 63. Lift 23 is mounted to a plastic base 53 (shown in more detail in FIGS. 16, 16B and 16C) which slidingly engages steel base plate 25. As planing occurs, wood shavings disperse throughout the work area. This messy environment creates a problem in moving movable lift 23. The inventors have found that a plastic/steel sliding interface between the base of the moveable lift and the base plate is a very reliable method of transporting the moveable lift and, at the same time, functions to clear the base plate of wood shavings which result from the planing. As the flitch proceeds rightwardly along the conveyor, moveable lift 23 follows the flitch.

Figure 8:
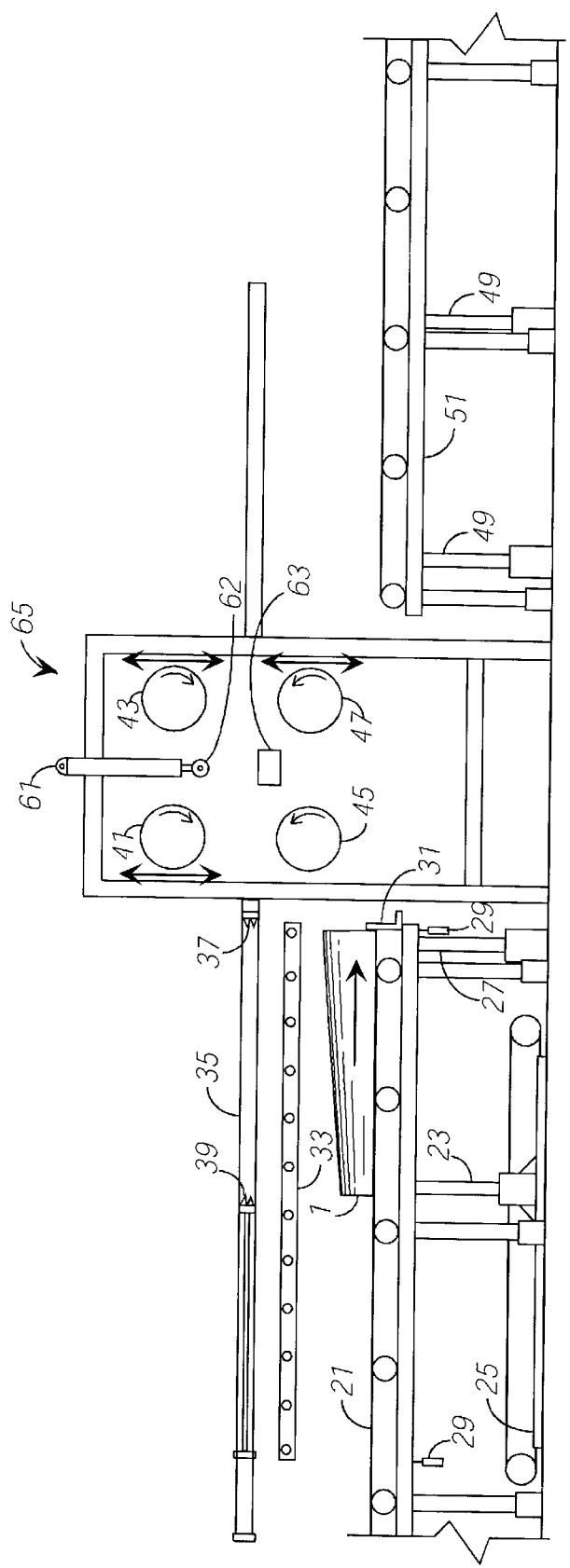
FIG. 8 is a view similar to that of FIG. 7 showing the flitch stopped at the rightward end of the infeed conveyor.

As shown in FIG. 8, the flitch eventually comes to rest against stop 31. Photodetector 29 senses the position of the flitch against the stop and signals the apparatus to shut down infeed conveyor 21. At this time also, movable lift 23 comes to a rest directly below the leftward end of the flitch. Fixed lift 27 is positioned directly below the rightward end of the flitch.

Figure 9:
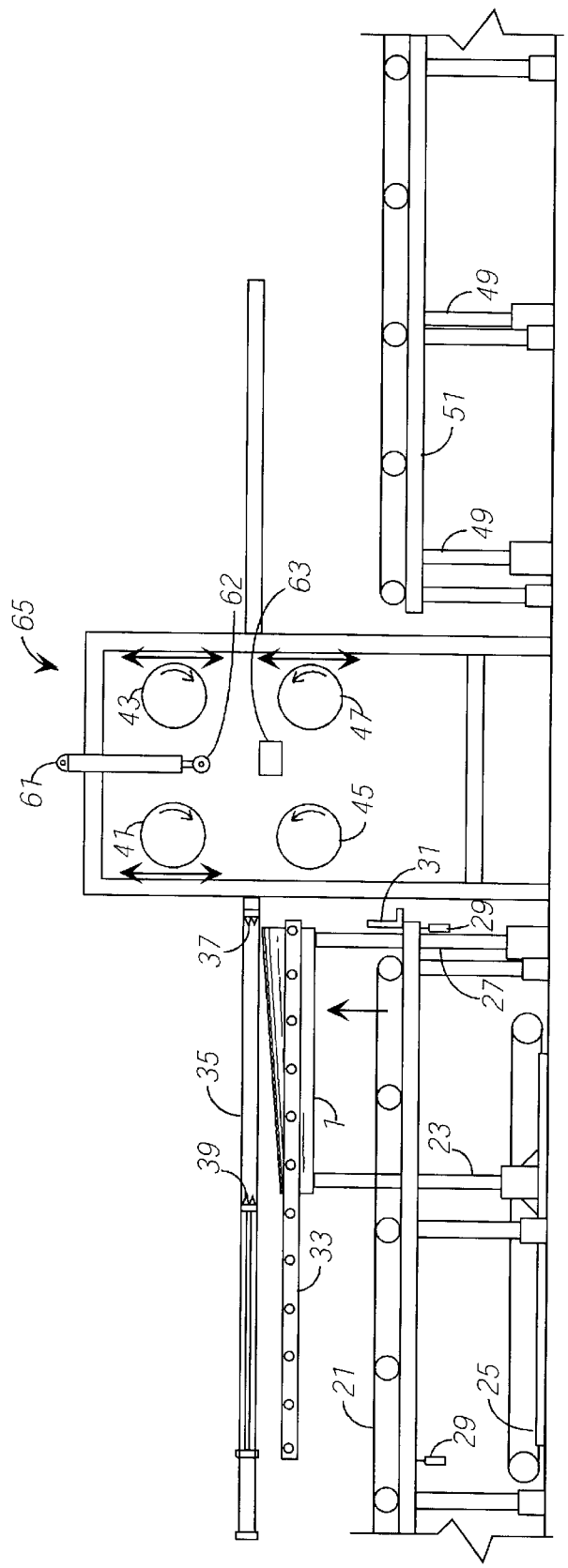
FIG. 9 is a view similar to that of FIG. 8 showing the flitch being elevated past the plurality of measurement devices.

Once the flitch has stopped and the lifts are positioned directly below the ends of the flitch, lifts 23 and 27 raise the flitch at a uniform speed past a bank of photodetectors 33 as shown in FIG. 9. The individual photodetectors (represented by circles in bank 33) are spaced at 6" intervals in a preferred embodiment, although the exact spacing is not critical. As the flitch passes the photodetectors, the photodetectors send signals to the computer of the invention which, in a preferred embodiment, is a microprocessor. Again, since the speed of elevation is a known constant, as the flitch passes the photodetectors, the vertical dimensions and contours of the flitch can be calculated by the computer of the invention.

Figure 17:
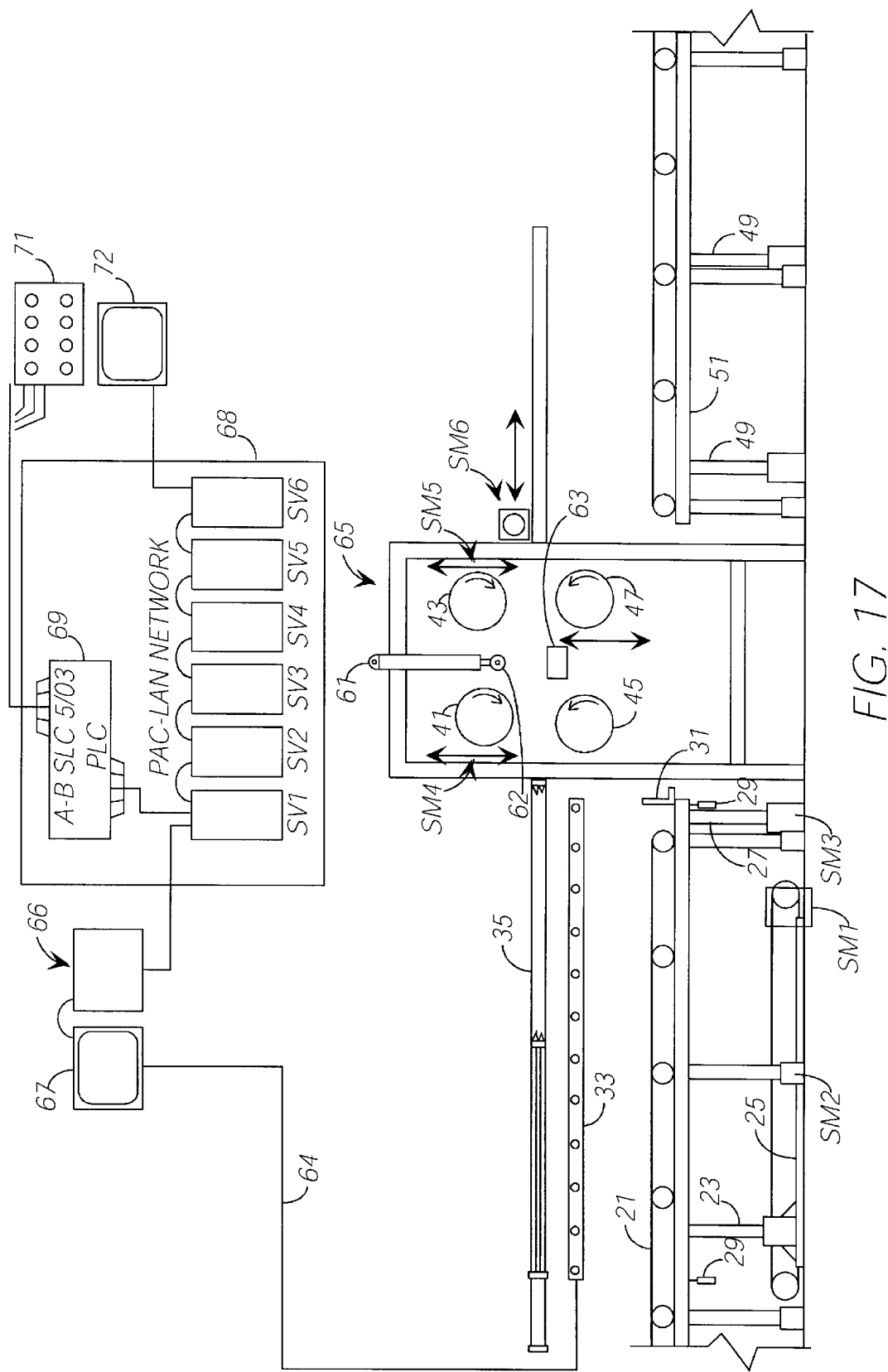
FIG. 17 is a view similar to that of FIG. 6, but also showing a block diagram of the scanning and measurement control system of the present invention.

The control system for the scanning, measurement and conveyor system of the invention is illustrated in block diagram form in FIG. 17. The system is shown to broadly comprise scanning/measurement computer 66 (which runs software available from Silvatech as described supra), monitor 67, servo drivers and motors SV1-SM1 (moving lifter drive), SV2-SM2 (fixed scissors up/down), SV3-SM3 (moving scissors up/down), SV4-SM4 (cutter #1, up/down), SV5-SM5 (cutter #2, up/down) and SV6-SM6 (flitch carriage drive)(all of which, in a preferred embodiment are Pacific-Scientific Servo Drivers), respectively, programmable logic controller 69 (which, in a preferred embodiment, may be Allen-Bradley/Rockwell Automation PLC Model SLC-5/03), monitor 72, and operator control console 71.

In operation, as the flitch passes up through the photodetector bank 10 (light curtain), vertical position information is passed from SV2 to computer 66 via a serial link. Note that SV3 is electronically linked to SV2 to provide precisely equal rates of movement of each scissor lift. Using this vertical information, computer 66 in combination with photodetector bank 10 scans the flitch as described infra. The generated information is then passed back to SV2 via the Pac-LAN network, and the information is shared and used by the appropriate servo drives. For example, SV2 and SV3 are positioned to provide optimum bottom planning, removing minimum material while providing 100% clean up (although 90% clean up may be sufficient to maximize yield). During planning, length information for the top stepping is relayed from SV6 to either SV4 or SV5 to move the top cutters appropriately.

Operator control 71 includes a plurality of push buttons, and also a series of photosensors connected to PLC 69. The PLC is not especially key to the operation, it provides logic control over the machine, utilizing interlock elements to ensure smooth operation. Typical functions are: SM1 moving lifter cannot move if SM3 is in the "up" position. SM6 carriage drive cannot move if cutter #1 is not running, etc.

Figure 10:
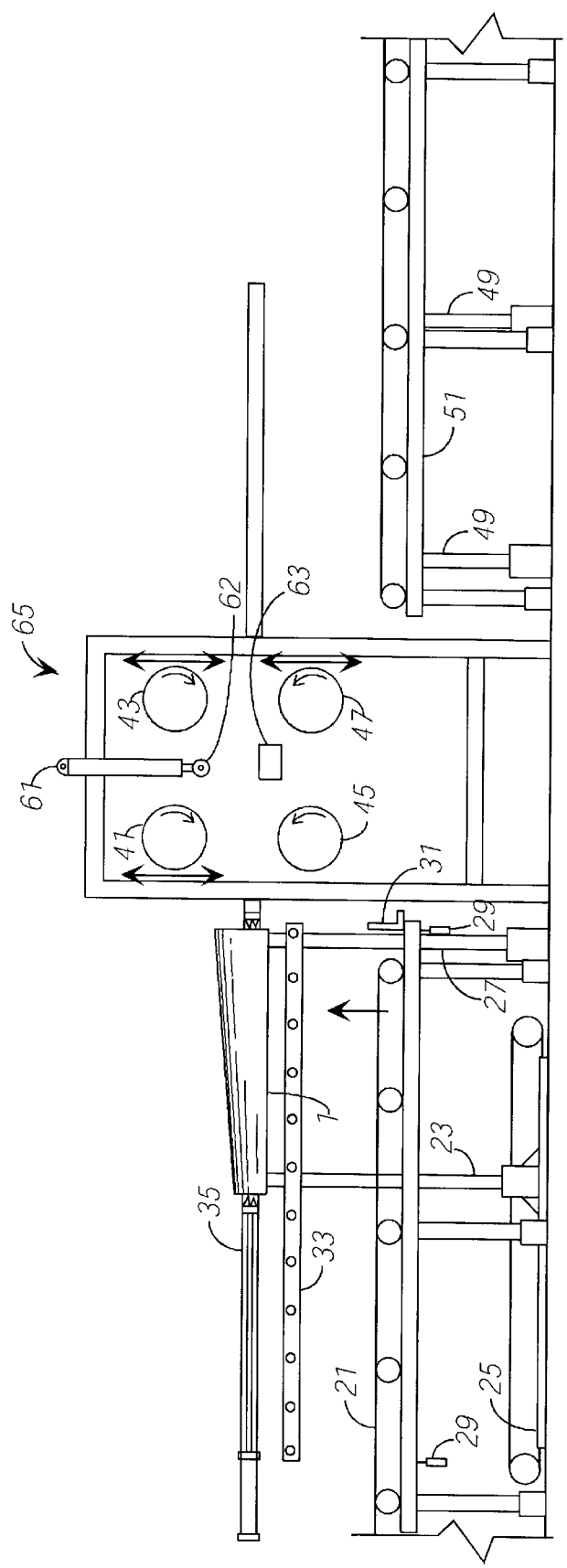
FIG. 10 is a view similar to that of FIG. 9 showing the flitch about to be clamped in place by the clamping dogs for entry into the planing section of the apparatus of the invention.

In FIG. 10, the flitch has been completely elevated past photodetector bank 33 and positioned co-linearly with clamping dogs 37 and 39, respectively. The clamping dogs hold the flitch in place and transport it rightwardly through planing section 65 of the invention.

In a preferred embodiment, planing section 65 comprises four planing heads (although alternative embodiments may include one or more of the heads shown in the preferred embodiment). Conventional planing heads 41 and 45 are arranged to plane the top and bottom of the flitch, respectively. Planing head 45 is fixed, whereas planing head 41 is vertically moveable as shown by the bi-directional arrow to the left of the head. Planing head 43 is a special concave planing head, shown in more detail in FIG. 3. Planing head 47 is a special grooving head, shown in more detail in FIGS. 5 and 5b. Planing heads 41, 43 and 47 move vertically in response to command signals from the computer of the invention. In a preferred embodiment, the computer is a microprocessor, programmed to optimally plane the flitch to minimize waste and maximize yield. Based on the dimensions made during the scanning operation, the planing heads make precise cuts in the flitch to maximize yield.

Figure 11:
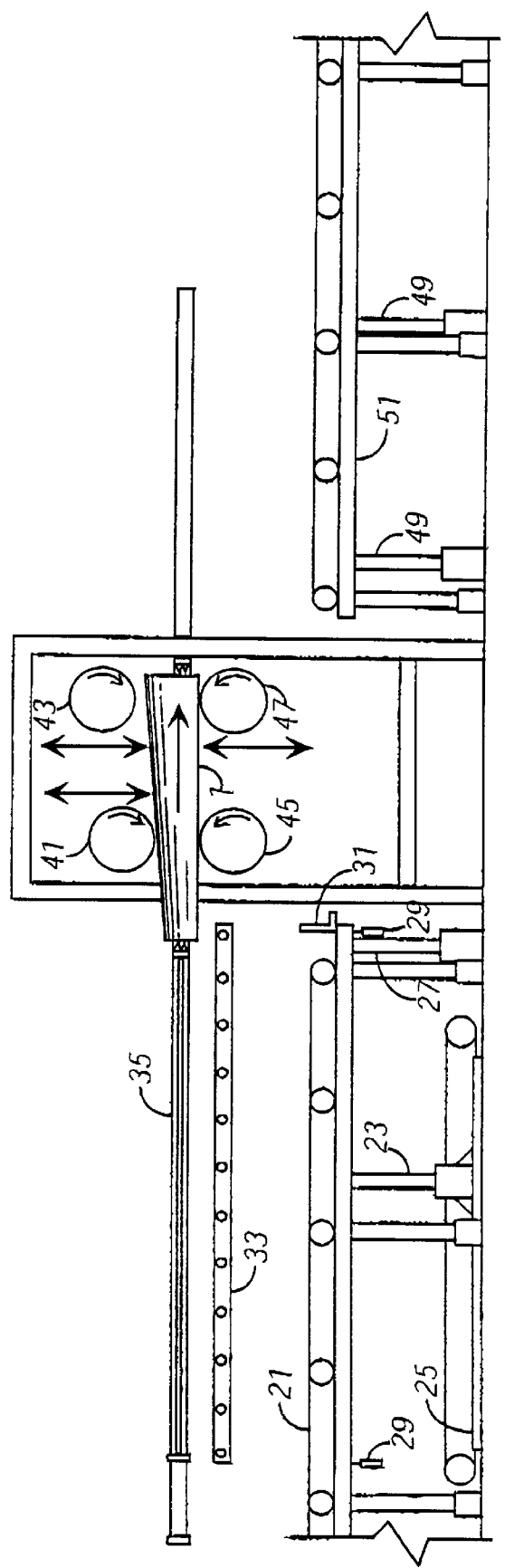
FIG. 11 is a view similar to that of FIG. 10 showing the flitch being planed by two of the conventional planing heads.

The planing operation is shown in FIG. 11. In this view, planing head 41 has moved into position to plane the top surface of the flitch, and planing head 45 is in a fixed position for planing the bottom surface of the flitch. The top planing head 41 has been precisely positioned to remove an exact amount of material specified by the microprocessor. Also shown in FIG. 11, grooving head 47 is positioned to cut grooves in the bottom surface of the flitch. Conventional planing machines cut continuous grooves 17 in the bottom surface of a flitch, as shown in FIGS. 4 and 4b. These grooved flitches are mounted on a rotary spindle for cutting of veneer by knife 15 as shown in FIG. 4B. As more and more material is removed from the flitch, the longitudinal grooves tend to weaken the flitch, causing it to break as the cutting continues. This results in wasted material. The computer-controlled automatic groove cutting of the present invention overcomes this problem. With the present invention a plurality of discontinuous grooves 19 can be cut in the flitch as shown in FIGS. 5 and 5B. Since there is more material in the flitch proximate its bottom surface the flitch is more stable as the cutting progresses, resulting in less waste.

When planing long flitches with a small cross-section, some "chattering" or deflection of the flitch may occur. As shown in FIG. 11, air cylinder 61 is operative arranged to move roller 62 into continuous contact with the top surface of the flitch to eliminate the chattering.

Although the speeds of operation are not especially critical, the present invention, in a preferred embodiment, can plane one (1) flitch/minute. It takes approximately 13 seconds to scan a flitch at a vertical lift speed of 25 feet/minute. It takes approximately 10 seconds for the clamping dogs to perform their function. Planing itself takes about 22 seconds at a conveyor speed of 0–80 feet/minute. It takes approximately seven (7) seconds to release the flitch after planning, and another seventeen (17) seconds for the carriage to return. The planning speed will automatically reduce if heavy cutting load is detected.

Figure 3:
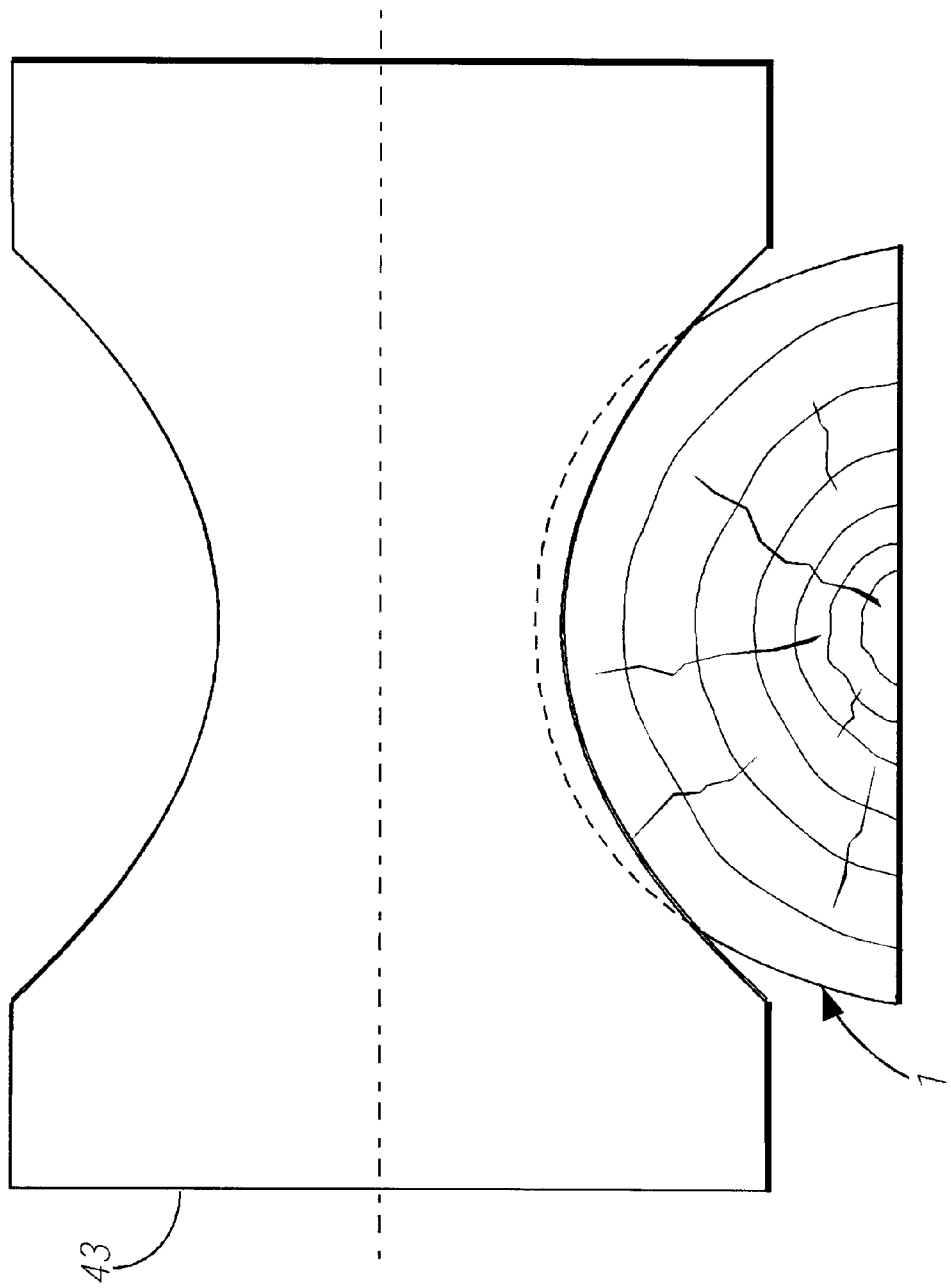
FIG. 3 is an end view of a flitch being planed by a concave planing head.
Figure 7:
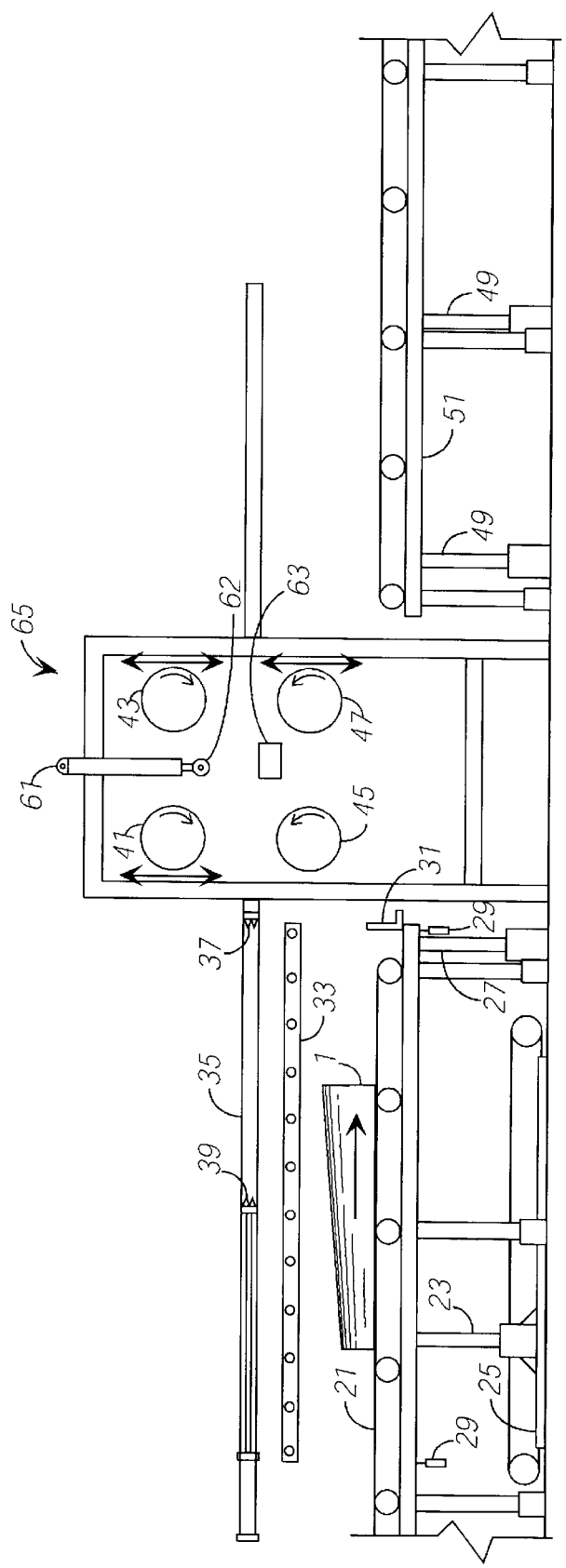
FIG. 7 is a view similar to that of FIG. 6 showing the flitch continuing to progress rightwardly and the movable lift also moving rightwardly.
Figure 11B:
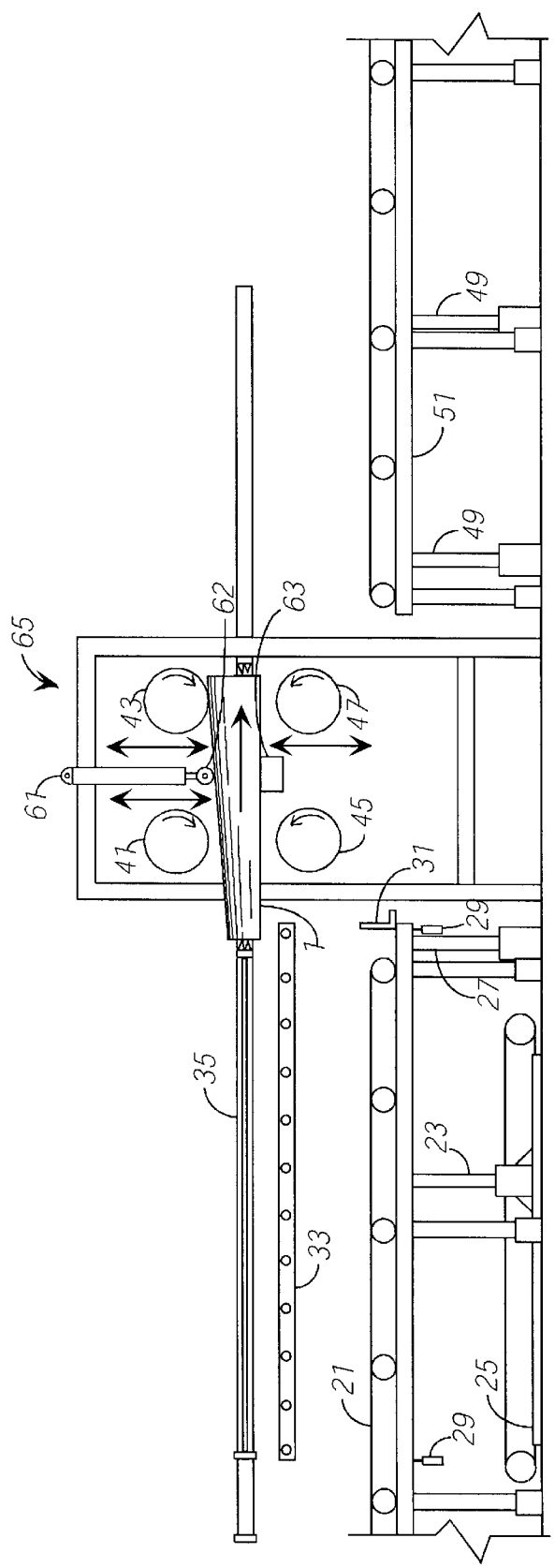
FIG. 11B is a view similar to FIG. 11 but showing the flitch being planed by a concave planing head.

FIG. 11B illustrates another planing operation which uses concave planing head 43 shown in more detail in FIG. 3 (an end view of the concave planing head planing the flitch). Planing with a concave head is typically done for certain flitches having a certain diameter (usually smaller diameters in the 12–18" range). The concave head is an optional part of the invention. It can be retracted or used as desired.

Figure 12:
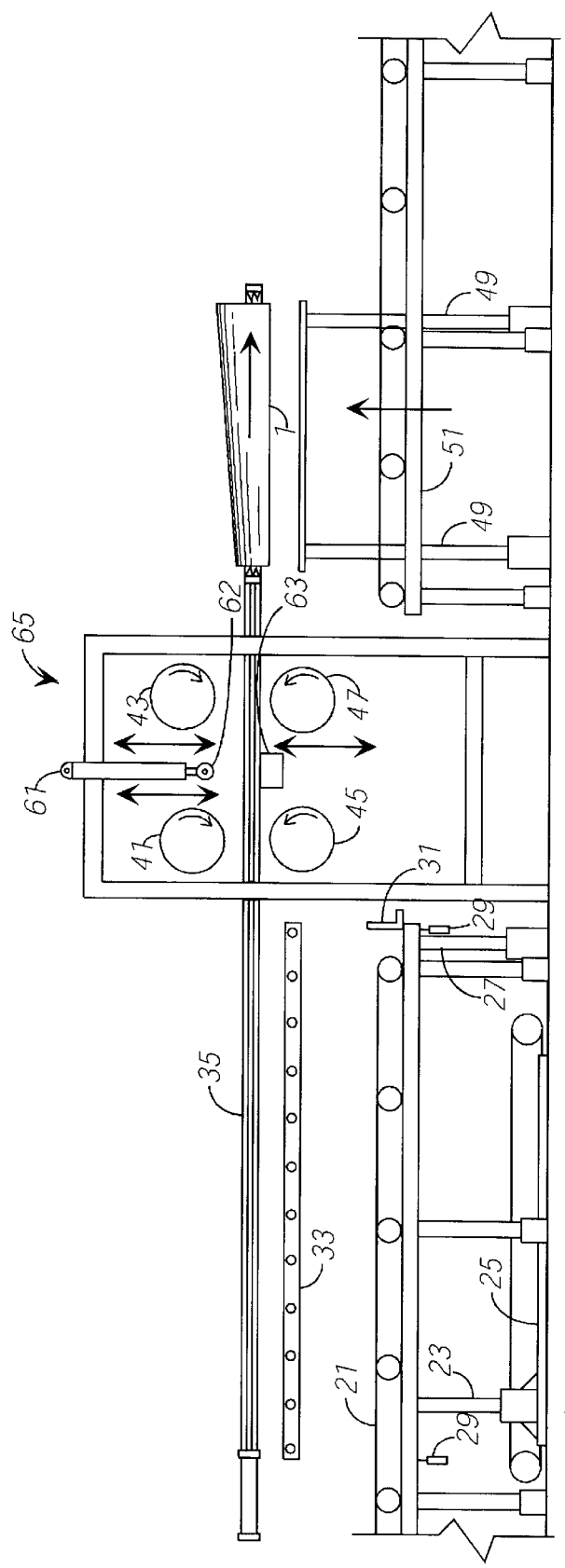
FIG. 12 is a view similar to that of FIG. 11, showing the flitch being ejected from the planing section of the apparatus of the invention.
Figure 13:
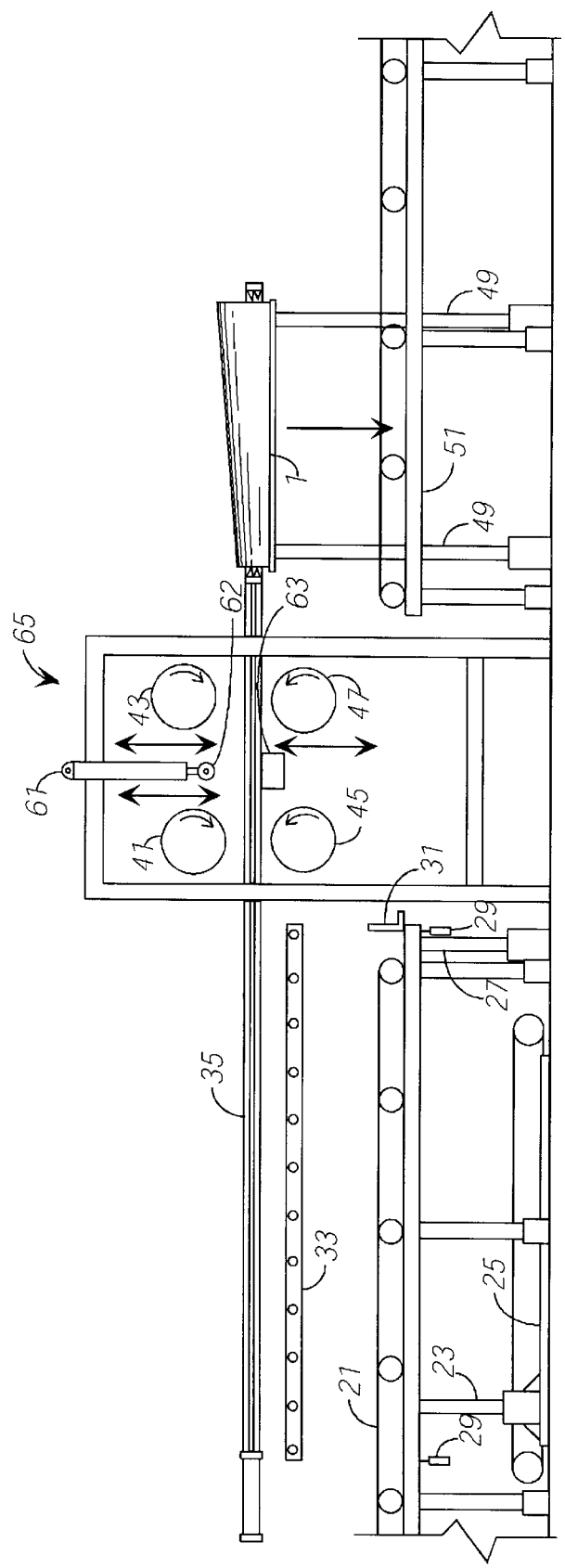
FIG. 13 is a view similar to that of FIG. 12, showing the output lift raised to support the flitch after planing.
Figure 14:
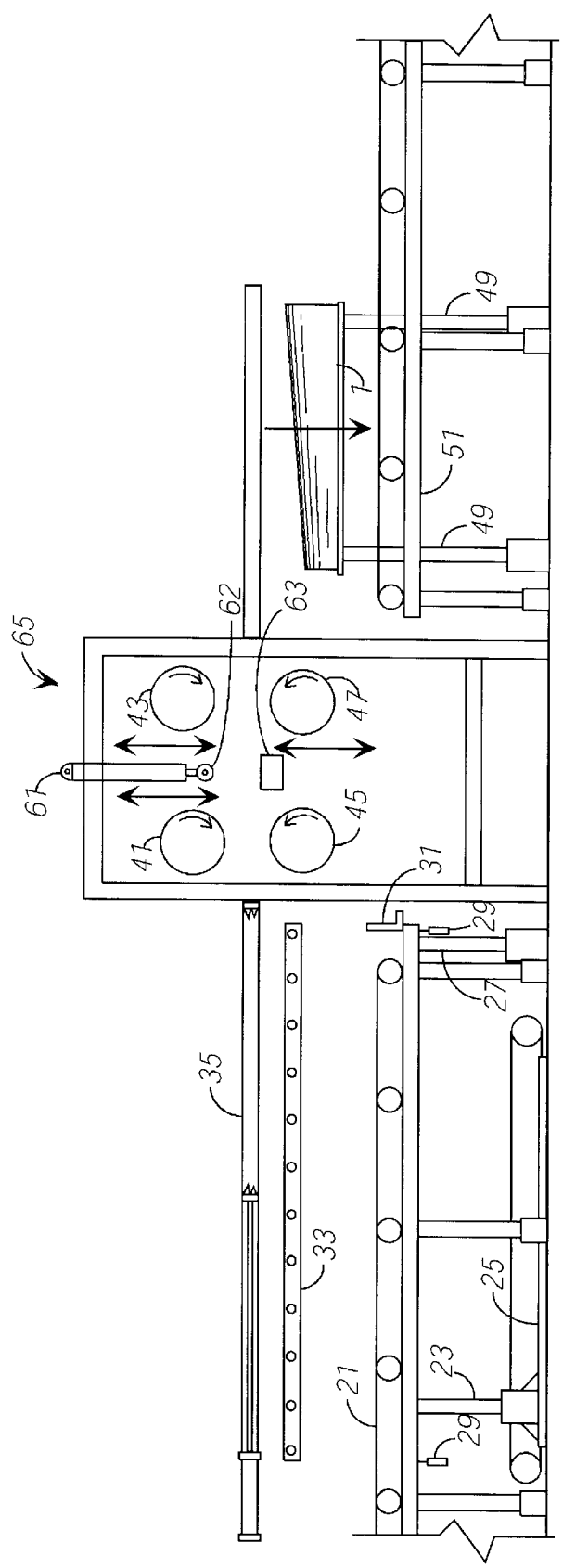
FIG. 14 is a view similar to that of FIG. 13, showing the output lift lowering the planed flitch to the output conveyor.
Figure 15:
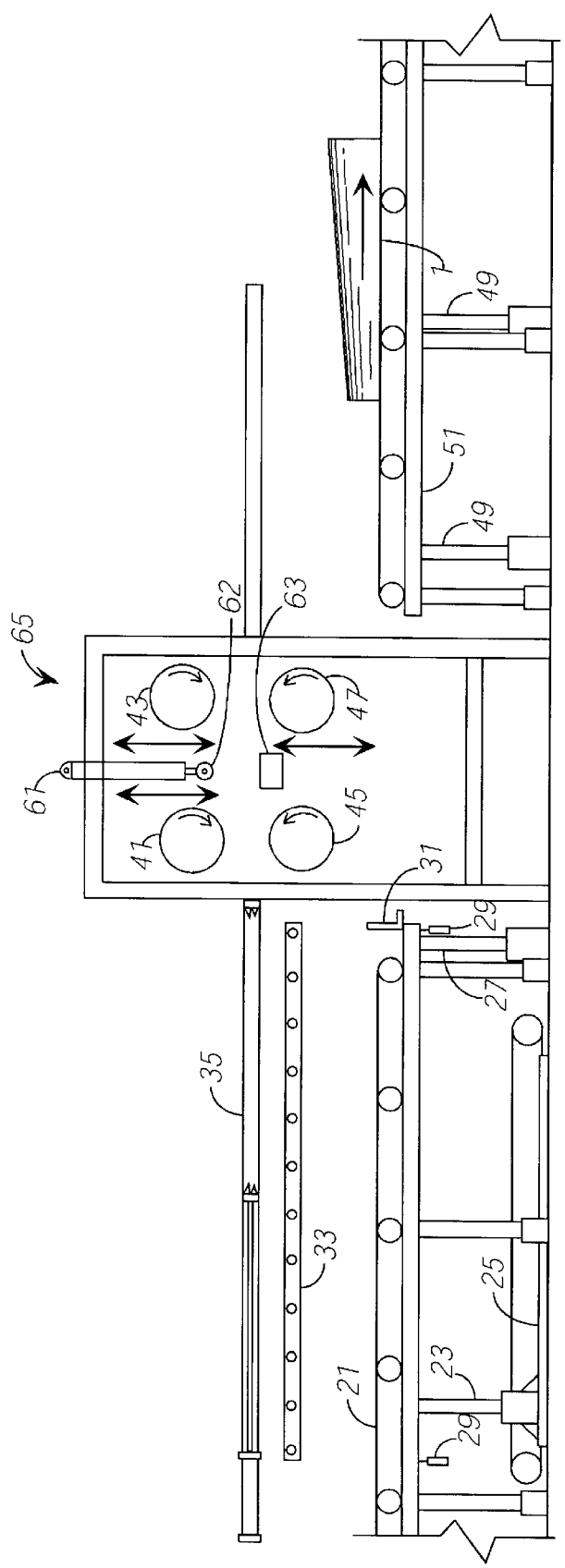
FIG. 15 is a view similar to that of FIG. 14. showing the planed flitch exiting the machine via the output conveyor.

Once the planing operation is complete, the planing heads retract and the flitch is ejected out of the planing section by the movable clamping dogs as shown in FIG. 12. As the flitch is ejected, mechanical scissor lifts (jacks) 49 rise to provide support for the ejected flitch. Once the flitch is secured upon the lifts as shown in FIG. 13, the clamping dogs are released and return to their original positions to start the process new. The flitch is then lowered to outfeed conveyor 51 as shown in FIG. 14. The flitch is then moved away from the machine by the conveyor as shown in FIG. 15.

Figure 16:
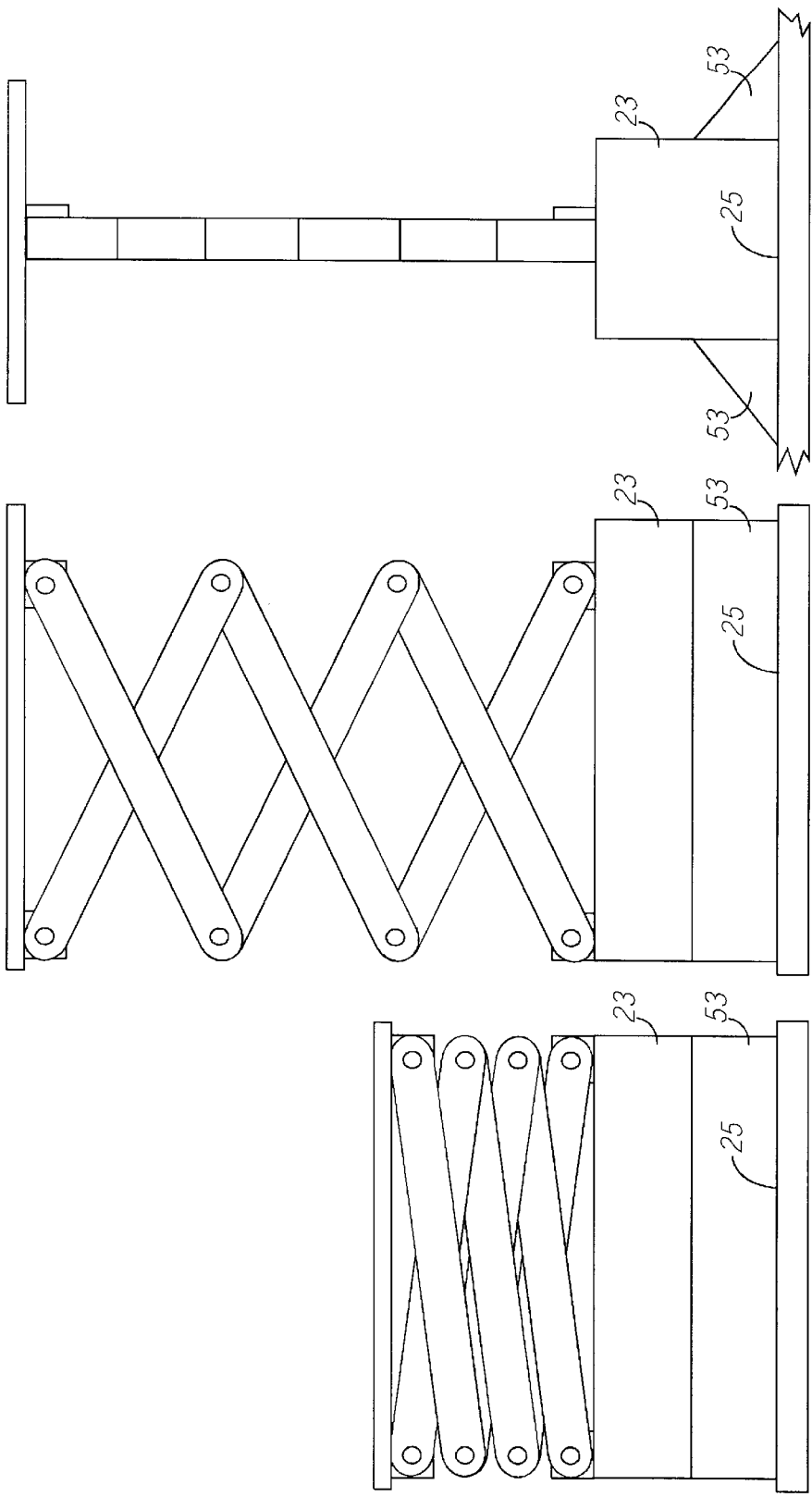
FIG. 16 is an end view of the mechanical scissor lift of the invention, shown in its lowered position.

Movable lift 23 is shown in more detail in FIGS. 16, 16B and 16C. As shown in end view in FIGS. 16 and 16B, lift 23 is a scissor type lift, driven by a motor at a constant known speed. The lift is physically mounted to a plastic base 53, which includes a "cow-catcher" type shape at its front and back as shown in FIG. 16C. This triangular shape functions to push wood shavings and other material out of the way as the lift moves back and forth along base plate 25. The lift is moved back and forth by timing belts secured to the lift and driven by a motor. Base plate 25 is typically a smooth piece of steel. The fixed lifts of the invention are similar in structure to the movable lifts, but do not require the plastic base and are obviously not moveable by timing belts.

The photodetector bank and software of the invention is available commercially from various suppliers, including Silvatech, Inc. of Vermont, USA; Applied Theory; and Inovec of Portland, Oreg. Moreover, the invention is not intended to be limited to photodetector measurement devices, as obviously lasers or other devices could be used to make the measurements. Similarly, the calculations for planing could be accomplished in a computer or in a microprocessor.

In combination, the photodetector bank and software comprise a "scanner". The scanner monitors the blocked-unblocked state of a row of parallel, coplanar infrared light beams six feet apart as the flitch is raised by a pair of lifters through the light curtain. Along with the light beams, the scanner also receives the elevation of one of the lifters (both lifters are at the same elevation unless a manual taper is selected by the operator), and two LVDT probe readings. The LVDT probes are located in the center of each lifter and measure the gap between the wood and the top of the lifter due to curvature of the wood.

The process involves separate and distinct top and bottom scans. The top scan determines the dimensions of the flitch and the top profile. After the top scan, the scanner computer determines the taper (elevation offset between the lifters) to be used when planning, and the set of positions to which the top planer will be set relative to the top profile (after taper) and the top planing profile are shown on the display. The displayed diameters are approximate, since slabbing is not considered. It assumes that the scanner is seeing a radius of the log.

The bottom scan primarily determines the highest point on the bottom, and thus how much thickness must be removed from the bottom. After the bottom scan, the planer opening for each step on the planed top profile is determined, and the lifter elevation, taper and top planer position table are sent to the controller (PLC).

The measured profile of the bottom is spatially rotated by the taper determined by top scan before finding the highest point. When scanning a flitch type for which the surface upon the lifters is inside the log, the LVDT reading for each lifter is added to the bottom profile at that lifter's position, in effect modifying the taper and elevation for calculation purposes.

Another function of the scanner is to report the length to the controller as it is determined so the controller can start moving the trailing log into positions in preparation for dogging (clamping). The maximum length seen is available to the controller at the completion of the top scan. This may be greater than the length shown on the screen, since small projections, felling hinges, etc., are not included in the length shown on screen. If the length is seen to increase as the flitch is raised (e.g., ends not square, projection on bottom, etc.). The value reported to the controller is updated immediately. The controller program determines what action to take in this event.

The specifications for top planning consist of five (5) parameters: minimum and maximum planning depth, minimum length for a sheet, length increment to be added progressively to the minimum for longer sheets, and percent taper. Setting percent taper to zero (0) results in the lifters being set to equal elevation before dogging. Setting it to 100 results in the lifters being offset to get the top of the flitch close to level before dogging. Anything in between produces the expected result.

A special provision is made for setting taper solely from the LVDT probe readings. If percent taper is set to −1, the flitch will be tapered so that the line between the tops of the LVDT probes is level. This would minimize the volume planed off the bottom if the curvature is large.

Percent taper setting is ignored (forced to 0) if the controller tells the scanner that a manual taper is set, and the controller then keeps the lifters offset as they were before the scan.

If minimum length is longer than the flitch, the actual length minus ½' is used. For the flitch type with the round side down, if the top side will be against the vacuum plane, then you can use the length parameters to prevent steps in the top planed surface. Set minimum length to >20', length step to 0, and maximum depth to 0 (blank).

The maximum depth parameter applies only to volumes of wood which could become part of a book. Its purpose is to prevent the wide end of the sheet from being discarded because minimum length or a length step was satisfied without it. It defers to the trimming phase decisions about what to keep and what to discard.

Projections above the top of the flitch which cannot satisfy minimum length nor add length to a sheet will be planed off regardless of the maximum depth parameter. Even a smooth, uniformly tapered flitch will be planed as deeply as necessary to satisfy minimum length. That same flitch would be planed with more steps (similar to a smaller length step) as the maximum depth parameter is set closer to the minimum depth. If maximum depth is not violated with the steps "length step" apart, no steps are added. Otherwise, the minimum number is added and the threshold for corrective action, but when that action is taken it is minimum depth that governs the planer opening. Users may find it instructive (but not necessarily useful) to try setting maximum depth equal to minimum depth.

If maximum depth is blank (zero), or less than minimum depth, this process is skipped. For bottom planning, only the minimum depth is specified.

In a preferred embodiment, there are a total of 108 specification lines as described above, all stored in non volatile (battery-backed) memory. The initial values are stored in a Read-Only Memory (ROM), which may be programmed to user specifications. The working copy in nonvolatile memory may be altered at will by the user. Of the 108 specification lines only four are shown on screen at one time. The arrangement of specification lines is by specie and by flitch type. For example, for Specie 1, three flitch types are "log, flat side down"; "log, round side down"; "log, flat side down".

Typically, at least for a new installation, most of the Species are left blank in the ROM, leaving ample space for the customer to store new setups.

The three flitch types listed above are associated with three icons and selected by three pushbuttons. The icon resembles the flitch end outline and appears to the lower left of the specification lines on screen. The four specification lines are selected by four pushbuttons and the selection is indicated on screen by a conspicuous arrow icon. The location of this arrow is remembered for each flitch type. Once a specification line is selected (e.g., the half-log type) if another flitch type is selected and the arrow moved, and then the half-log is re-selected, the arrow will return to the position it had last time the half-log was selected.

Parameters can be modified and used experimentally without saving them back to non-volatile memory. They remain in their modified state until a specie change is done (reselecting the current specie counts here as a specie change). Due to the likelihood of losing the changes accidentally, it is best to save changes to an unused specie number and work in that specie until the changes are settled.

Modes of Operation

There are three operating modes: "RUN", "STOP/ENTER", and "CALIBRATE". RUN mode is the normal state of the system, and is the initial state when power is applied.

STOP/ENTER mode is for altering settings and parameters, and for changing the "Specie" selection. In STOP/ENTER mode, screens other than the Operator Screen can be selected to view or alter the parameters on them.

STOP/ENTER mode is NOT REQUIRED for changing the Flitch Type or Spec Line selection—these are normally changed while in RUN mode although the buttons used for this also work in STOP/ENTER as long as the Operator Screen, which shows the Flitch Type icon and Spec Lines, is being displayed.

The system is toggled between RUN and STOP/ENTER mode by pressing the right side of the middle rocker switch on the Scanner Switch Panel.

CALIBRATE mode is used when initially setting up the machine and after replacing or remounting any part of the Lifter mechanism which affects the position scale. It would also be needed after any catastrophic event which knocks the light curtain out of alignment. It is described separately under its own title.

Screens:

There are 4 screens of interest which may be displayed on the Scanner Monitor. Common to all screens, at the bottom of the screen are shown the Clock/Calendar Line and a live display of the Scan Curtain.

Screens are selected for display while in STOP/ENTER mode by pressing a number followed by 'R' and then 'ENT' on the Keypad. Actually, for screen display only, it doesn't matter whether 'R' comes before or after the number. The screens of interest are identified here as the 'R1', 'R7', 'R9' and 'R20' screen. Other screens can be selected but serve no purpose in this product application.

'R1' screen:

The Operator Screen is the one which is displayed whenever in RUN mode. The Spec Lines are shown on this screen. It also shows the associated Flitch Type icon, the flitch measurements, and a graphic depiction of the top profile and planning solution when available.

'R7' screen:

The Print Reports screen serves only one purpose in this application, to display the Sensor Calibration data If no printer is connected, make sure the bottom parameter on the screen is '0'.

If a printer is connected, "screen snapshots" can also be printed including graphics to aid in diagnosing any problems and for recording final parameter table values.

'R9' screen:

The Curtain Setup screen shows information about the Light Curtain. Some of the information on this screen is altered by the system and must not be entered by the operator. Other parameters here may be used to inform the system of a damaged sensor so it will be ignored until it can be replaced.

'R20' screen:

The Clock Setting screen is used to set the Clock/Calendar.

Operation—Interacting with the Scanner

Changing Species:

To select a different Species, the Scanner must be in STOP/ENTER mode. The mode is shown at the top of the Operator screen; for any other screen to be displayed, the Scanner must be in STOP/ENTER mode. On the Keypad (the black rectangular button array), press 'S' followed by a digit. Do not hold 'S' down while pressing the digit—that is for saving changes to nonvolatile memory. The new Specie Number will appear on the screen and the parameter values for that Specie will replace the former ones. Before operation, Scanner must be put back in RUN mode.

Changing Parameters, Getting and Moving the Cursor, Numeric Entry:

To alter any parameter, it must be shown on the screen at the time and the Scanner must be in STOP/ENTER mode. The screen which contains that parameter is selected as above except that the 'R' key is held down when 'ENT' is pressed. Thus, to alter any Planing Spec parameter, you would first set STOP/ENTER mode, then select the Operator Screen for entry by pushing '1', then holding 'R' down and pressing 'ENT'. A blinking cursor appears on the screen under the first parameter. The cursor can be moved either way by pressing either side of the top rocker switch on the Scanner Switch Panel. Cursor movement has an auto-repeat mode which starts when the rocker is held down for about 0.3 seconds. The cursor "wraps around" after reaching the first or last parameter on the screen, so the quickest route from the first to the last parameter is backwards.

Position the cursor under the parameter to be changed (many parameters are longer than the cursor—for them, put the cursor under the left end of the parameter). Integer values can be entered directly from the Keypad. Press the digit key(s) followed by 'ENT'. All parameters can be incremented and decremented using the rocker switch at the top of the main switch panel (left side increments, right side decrements). The inc/dec rocker MUST be used to enter or alter fraction values. Enter the nearest integer value using the Keypad, then adjust it to the value you want using the inc/dec rocker.

To enter a negative value, either decrement from zero (0) or use one of the 'M' keys as a '−' sign.

On the Operator Screen ('R1'), if the parameter to be changed is for a Flitch Type other than the one currently selected, push the appropriate Flitch Type button to get the associated Spec Lines on the screen. You may do this while the cursor is present.

Saving Specie data to Nonvolatile Memory:

Whenever the Planing Specs of the current Specie are different from those saved in Nonvolatile Memory, a '+' appears to the right of the Specie number (at the top of the screen if in the Operator Screen). This is to warn that the changes will be lost if the user selects a new Specie. You can save the new table to the same or a different Specie Number. Set "STOP/ENTER" mode if not in this mode already, then on the Keypad press 'S' and while holding 'S' down press a digit. This saves all 12 Spec Lines (4 lines×3 Flitch Types) to that Specie #.

Starting Specie Tables from Scratch:

To clear ALL table values from a Specie, select Specie 0 (Press 'S', '0'), which clears the working tables, then save the blank tables to the Specie the user wishes to create using the procedure above. The user can enter values and run with Specie 0, but cannot save to Specie 0! Also, since there is no Specie 0 table in nonvolatile memory, the '+' sign does not appear for Specie 0.

Operation-Scanning

Scanning is initiated via the Controller, and so the required operator's action is defined by the Controller programming and controls. The section titled "BASIC PRINCIPLES" above outlines what happens in the scanning process.

Regarding the display, two traces are plotted on the screen after the Top Scan. The broken line shows the profile of the top of the flitch AFTER TAPER. This means if a taper is set, the profile is rotated into the orientation it will have as it goes through the planer. The solid line shows the planing solution on the same scale to give a visual indication of what the top planer will remove. This solid trace may drop off to zero at either end or possibly elsewhere. If it drops to zero anywhere EXCEPT at the ends, the user may have the Length or Length Step parameter set to zero. Zeros are never included in the planning profile. It is also possible that the broken and solid traces are not exactly the same length. This is normal, and will happen if the flitch has a projection off the end which is not recorded as part of the length for calculation purposes. The initial and final settings of the Top Planer are the nonzero trace points nearest the ends. The Scanner program is intended to leave no part of the top unplanned, to avoid "feathers". To accomplish this, the Length Stop is ignored if necessary when the sheet being extended reaches the end of the flitch. If a Max Depth was specified, the zero areas are filled in.

The vertical resolution of the display corresponds to $\frac{1}{8}$" at the planer. It is possible therefore that not all of the steps show up on the display. The horizontal resolution is 6", same as the light curtain. The presentation is therefore not to scale—the vertical aspect is greatly exaggerated to show as much detail as practical.

The plots are shifted so the end of the flitch nearest the planer is shown at the end of the graph. The lifters are shown in their correct horizontal positions relative to the flitch, rather than above their respective sensor positions. Their vertical positions are not represented, nor is the bottom profile.

Calibration

Calibration determines the location on the Lifter Position scale of each sensor. The LVDT's are ignored—their calibration is in the Controller. Scanner calibration also does not establish the Planer position on the Lifter Position scale. It therefore does not have to be repeated when a cutter is replaced, but there will be a procedure for locating the cutting plane in the Controller.

Two tables are generated, one for Top Scans and one for Bottom Scans, Using two tables avoids inaccuracy due to sensor hysteresis. Calibration is done using a straightedge, preferably one long enough to block the whole curtain. It must be thick enough to allow some processing time between the Top and Bottom Scans. The upward movement during calibration is at the same speed as during a normal scan, to eliminate error due to any fixed time skew between lifter elevation measurement and the light curtain sample associated with it. Four complete scans are performed automatically and the results averaged. Since the Movable Lifter blocks one sensor, the whole procedure must be repeated after moving the lifter. The Fixed Lifter also blocks a sensor, but since that one is never used for the Bottom Scan it doesn't matter.

The straightedge must be rigid enough to avoid significant flexing (including that due to resonance). A length of square or rectangular tubing is suggested.

If the straightedge is not long enough to calibrate the whole curtain, the calibration can be done in sections (may as well move the lifter between sections), but since the fixed lifter is near the end of the curtain the length can't be much shorter than the curtain. One of the otherwise unused buttons on the main switch panel must be used for calibration. In RUN mode, store the straightedge thickness "into" one of the yellow buttons on the main switch panel by pressing the digits on the keypad and then the button (don't press 'ENT'). If the thickness contains a fraction, you will have to use the inc/dec rocker to alter the value from the nearest integer by holding the Right side of the rocker to Decrement or the Left side to Increment, and pushing the button once for each $\frac{1}{16}$" change. You can view the value "in the button" by selecting the 'R3' screen, but you can't change the value while viewing this screen because you can only view the screen in STOP/ENTER mode. If you prefer, you can temporarily plug the monitor into the second computer and view the "button values" while you are doing this. The "button values" can be saved along with the Species Parameter Tables if the user desires, as long as the user remembers which Specie he saved it in. This procedure may be inconvenient, but the need for it is infrequent, and the user can store the straightedge thickness in ROM so it doesn't have to be entered.

CALIBRATE mode is entered from RUN mode by holding the 'ENT' key down and pushing the left side of the middle rocker on the Scanner Switch Panel. While in Calibrate mode (indicated at the top of the Operator Screen), push the button on the main switch panel which contains the straightedge thickness. Next, tell the Controller to initiate calibration (procedure for this not defined yet). The lifters will raise the straightedge through the light curtain 4 times and then Calibration mode will terminate. The Controller will lower the straightedge gently onto the rollcase. Then move the Movable Lifter and repeat this paragraph once to get the Bottom Calibration value for the sensor that was blocked by the lifter.

After calibrating, the user should record the calibration data so it can be programmed in the ROM. That way, if the user ever has to do an "S98" (see Miscellaneous), he won't have to repeat the calibration. Select the 'R7' screen (set STOP/ENTER mode, push '7', then hold 'R' down and push 'ENT'). If no printer is connected, make sure the bottom parameter (PRINTER TYPE) is set to 0. Then go up 2 lines to "PRINT SENSOR CALIBRATION" and enter '0'. The sensor calibration values will be displayed directly (set bottom parameter to '1'). It is, in fact, printed automatically when calibrating.

Light Curtain Display

The Light Curtain display is just above the Clock/Calendar line at the bottom of the screen. It contains 48 dashes with tic marks below it to aid in counting. Sensor #1 is at the right. Since your curtain contains 41 sensors, the last 7 positions on the left are not used. When a light beam is blocked, a solid block appears on top of the short dash for that sensor. This display is always active on all screens.

On the R9 screen, whenever the Scanner is configured for Bottom Scan, two x's appear above the Light Curtain display. These correspond to the sensors assumed to be blocked by the lifters. Any unused sensor positions are likewise marked, and if you have designated any "bad sensors" on this screen, they are also.

Miscellaneous

CPU Resets

Each computer has a red button next to the power switch. This resets the computer. If the screen shows a lot of garbage (generally unrecognizable patterns of dots/lines, etc.), push the reset buttons on both computers.

The CPU resets do not reset the processors in the Switch Panel nor the Scanner i/o. Turning the $2^{nd}$ computer or the Scanner computer off for 10 seconds resets the Switch Panel or the Scanner i/o, respectively.

$2^{nd}$ Computer Reset

If the switch panel is not working, first try resetting both computers by pushing the red buttons next to the power switches. If this fails, then try turning them off for 10 seconds. If that fails, push S, 9, 9 on the Keypad.

'New Log' Reset

The 'New Log' reset normally comes from the Controller. While no need for it is anticipated, the extra (white) button at the top of the Scanner Switch Panel duplicates this function. Note, this does not erase the plot from the screen. The plot is erased at the BEGINNING of a scan.

Table Data Reset

To reset ALL tables including the calibration table to the initial values from the ROM, use this procedure:

Set RUN mode if not already in RUN. Push S, 9, 8 on the keypad. Then push any red or yellow button on the main switch panel. This discards all changes the user entered on the setup screens (except clock setting) and all calibration data, and reloads the values from the ROM.

Thus, it is seen that the objects of the invention are efficiently obtained, although changes and modifications to the invention may be made without departing from the scope and spirit of the invention as described in the appended claims.

What is claimed is:

1. A method of planing a flitch having a first generally planar surface and a second generally frustoconical surface, comprising:

measuring distance between said first and second surfaces at a plurality of longitudinally spaced positions along said flitch;

calculating a planing operation of said flitch based upon said plurality of distance measurements; and, planing said flitch according to said calculation.

2. A method of planing a flitch as recited in claim 1 wherein said calculating step optimizes yield and minimizes waste.

3. A method of planing a flitch as recited in claim 1 wherein said measuring comprises moving said flitch past a bank of photodetectors at a fixed speed.

4. A method of planing a flitch as recited in claim 1 wherein said planing comprises cutting at least one discontinuous groove in said first surface of said flitch.

5. A method of planing a flitch as recited in claim 1 wherein said planing comprises making at least two stepped planing cuts in said flitch.

6. An apparatus for automatically planing a flitch, comprising:

means for making a plurality of distance measurements between a first generally planar surface of said flitch and a second generally frustoconical surface of said flitch;

means for calculating a planing operation for said flitch based upon said measurements; and, means for planing said flitch in accordance with said calculations.

7. An apparatus for automatically planing a flitch as recited in claim 6 wherein said means for making a plurality of distance measurements comprises:

at least one measuring device; and, means for moving said flitch past said plurality of measuring devices at a uniform speed.

8. An apparatus for automatically planing a flitch as recited in claim 7 wherein said measuring device comprises a photodetector.

9. An apparatus for automatically planing a flitch as recited in claim 7 wherein said means for moving said flitch past said plurality of measuring devices at a uniform speed comprises at least on mechanical scissor jack driven by a motor.

10. An apparatus for automatically planing a flitch as recited in claim 6 wherein said means for calculating a planing operation for said flitch based upon said measurements comprises a microprocessor programmed to process said measurements and calculate optimum planing for said flitch.

11. An apparatus for automatically planing a flitch as recited in claim 10 wherein said means for planing comprises at least two planing heads for planing said first and second surfaces, respectively, where said at least two planing heads operate in response to commands from said microprocessor.

12. An apparatus for automatically planing a flitch as recited in claim 11 wherein one of said planing heads is fixed and one of said planing heads is movable, and said movable planing head moves in response to commands from said microprocessor.

13. An apparatus for automatically planing a flitch as recited in claim 11 further comprising a movable concave planing head, operatively arranged to move in response to commands from said microprocessor.

14. An apparatus for automatically planing a flitch as recited in claim 11 further comprising a groove cutting planing head, operatively arranged to cut grooves in said flitch in response to commands from said microprocessor.

* * * * *